United States Patent
Phan

(10) Patent No.: US 11,840,126 B2
(45) Date of Patent: Dec. 12, 2023

(54) FRONT DEFROSTER NOZZLE

(71) Applicant: TOYOTA JIDOSHA KABUSHIKI KAISHA, Aichi-ken (JP)

(72) Inventor: Vinh Long Phan, Toyota (JP)

(73) Assignee: TOYOTA JIDOSHA KABUSHIKI KAISHA, Aichi-Ken (JP)

( * ) Notice: Subject to any disclaimer, the term of this patent is extended or adjusted under 35 U.S.C. 154(b) by 252 days.

(21) Appl. No.: 17/204,945

(22) Filed: Mar. 18, 2021

(65) Prior Publication Data
US 2021/0347228 A1 Nov. 11, 2021

(30) Foreign Application Priority Data
May 7, 2020 (JP) .................................. 2020-082260

(51) Int. Cl.
*B60H 1/24* (2006.01)

(52) U.S. Cl.
CPC .................................... *B60H 1/242* (2013.01)

(58) Field of Classification Search
CPC ...................................................... B60H 1/242
USPC ........................................................ 454/127
See application file for complete search history.

(56) References Cited

U.S. PATENT DOCUMENTS

| | | | | |
|---|---|---|---|---|
| 3,608,469 A | * | 9/1971 | Mutoh | B60S 1/54 454/127 |
| 5,980,379 A | * | 11/1999 | Shibata | B60H 1/3407 454/127 |
| 9,278,605 B2 | * | 3/2016 | Vander Sluis | B60H 1/00564 |
| 9,895,960 B2 | * | 2/2018 | Sato | B60H 1/3407 |
| 11,052,875 B2 | * | 7/2021 | Mullen | B60H 1/3407 |
| 2016/0075310 A1 | | 3/2016 | Terai et al. | |
| 2021/0347230 A1 | * | 11/2021 | Louis | B60H 1/242 |

FOREIGN PATENT DOCUMENTS

| | | | |
|---|---|---|---|
| JP | H0699731 A | * | 4/1994 |
| JP | H10175430 A | * | 6/1998 |
| JP | 2015003605 A | | 1/2015 |

OTHER PUBLICATIONS

JP H0699731 A translation AI USPTO (Year: 2022).*

* cited by examiner

*Primary Examiner* — Allen R. B. Schult
(74) *Attorney, Agent, or Firm* — HAUPTMAN HAM, LLP

(57) ABSTRACT

A front defroster nozzle includes a connecting portion connected to an air conditioner at a lower side of a central portion in a vehicle width direction of a front windshield, a nozzle lower portion provided at an upper side of the connecting portion, and a nozzle upper portion provided at an upper side of the nozzle lower portion, so as to slope towards a vehicle rear side, the nozzle upper portion having a blower aperture portion that extends in the vehicle width direction and opens at an upper end portion of the nozzle upper portion and at an instrument panel, and, when viewed in a cross-section taken along a vehicle front-rear direction, a blow-out angle formed between the nozzle upper portion and the front windshield is set such that the blow-out angle at both end portions in the vehicle width direction is larger than the blow-out angle at the central portion.

8 Claims, 9 Drawing Sheets

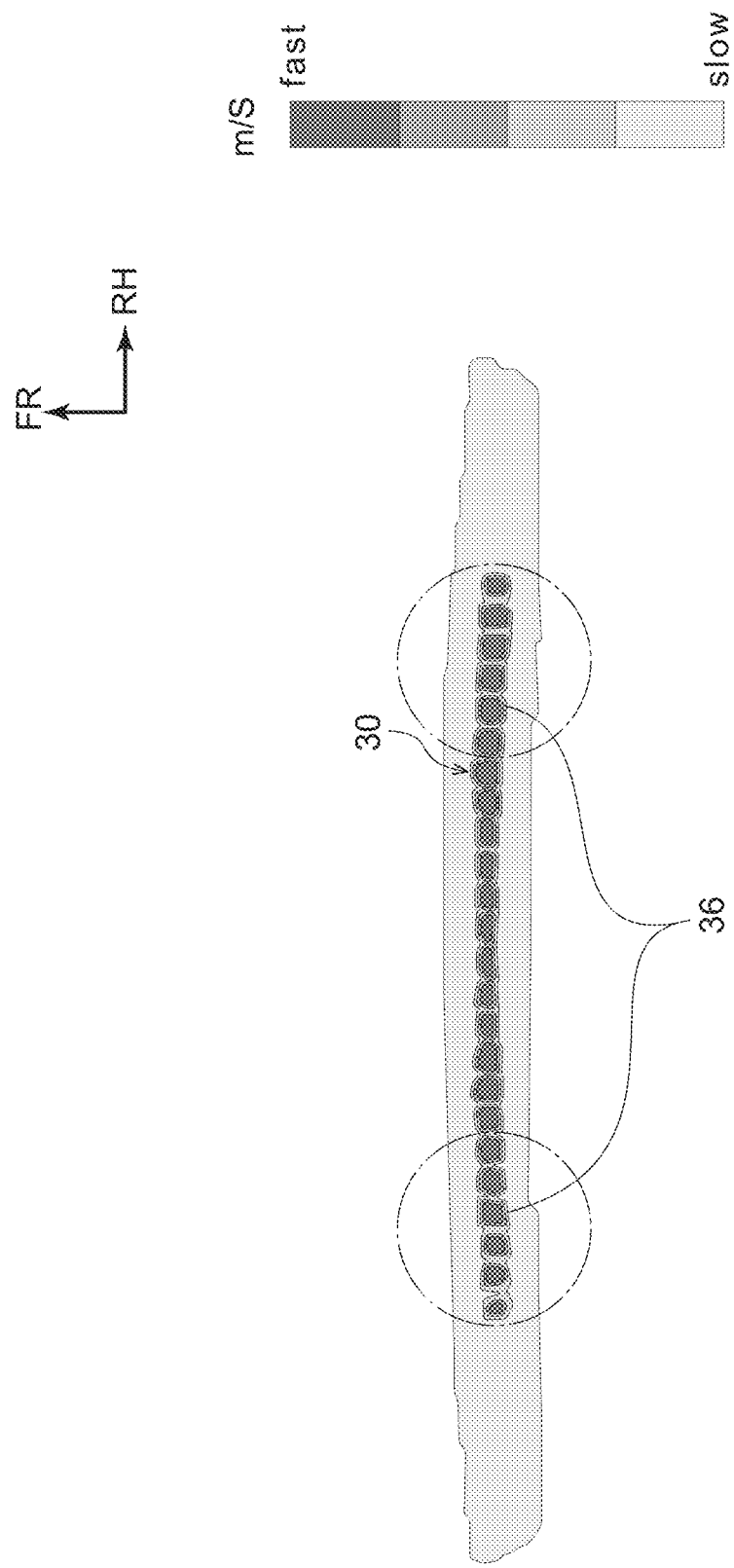

FRONT DEFROSTER NOZZLE

CROSS-REFERENCE TO RELATED APPLICATION

This application is based on and claims priority under 35 USC 119 from Japanese Patent Application No. 2020-82260 filed May 7, 2020, the disclosure of which is incorporated by reference herein in its entirety.

BACKGROUND

Technical Field

The present disclosure relates to a front defroster nozzle.

Related Art

Conventionally, front defroster nozzles (hereinafter, referred to where appropriate as 'defroster nozzles') are widely used in order to prevent frost or dew from forming on a front windshield (hereinafter, referred to where appropriate as a 'windshield) or to remove mist therefrom. These defroster nozzles have a blower aperture portion above an instrument panel that is used to blow warm, dry air from an air-conditioner onto the windshield.

In recent years, in conjunction with the increasing electrification of automobiles, there has been a trend towards an increased number of electrical components such as head-up displays being provided within the instrument panel so that installation space for the defroster nozzle is becoming gradually smaller. Accordingly, a reduction in the size of the defroster nozzle is sought.

Here, in order to remove mist from a wide area of the windshield, it is necessary that the air blown out from the blower aperture portion of the defroster nozzle be able to reach all the way to both end portions in the vehicle width direction of the windshield. However, unlike a conventional defroster nozzle, in a small-sized defroster nozzle it is not possible to set a long enough length in the vehicle width direction for the blower aperture portion, and a curvature of side surface portions thereof becomes extremely large. Because of this, in a small-sized defroster nozzle, it is difficult to ensure that air is able to reach all the way to both end portions in the vehicle width direction of the windshield.

For this reason, in Japanese Patent Application Publication Laid-Open (JP-A) No. 2015-003605, a defroster nozzle is disclosed in which, in order to enable air to be blown as far as both end portions in the vehicle width direction, guide fins are provided in the blower aperture portion. In this same publication it is further disclosed that the blower aperture portion is divided into two in a front-rear direction in order to solve the problem of an insufficient air supply to upper portions of the windshield that is caused by providing these guide fins. In other words, a structure is employed in which, by dividing the air supply to the windshield into an air supply to both end portions in the vehicle width direction of the windshield, and an air supply to a central portion in the vehicle width direction of the windshield, any interference to the air supply is inhibited, and air can be supplied over a wide area to the entire windshield surface.

SUMMARY

However, in the above-described technology, it is necessary both for a plurality of guide fins to be provided, and for the blower aperture portion to be divided into a front portion and a rear portion, so that the structure of the defroster nozzle becomes very complex.

The present disclosure was conceived in view of the above-described circumstances, and provides a front defroster nozzle that has a small size and a simple structure, and enables mist to be removed from a wide area of a windshield.

A front defroster nozzle of a first aspect of the present disclosure includes a connecting portion that is configured to be connected to an air conditioner at a vehicle lower side of a central portion in a vehicle width direction of a front windshield of an automobile, a nozzle lower portion provided at a vehicle upper side of the connecting portion, and a nozzle upper portion provided at a vehicle upper side of the nozzle lower portion. The nozzle upper portion slopes towards a vehicle rear side, and has a blower aperture portion that extends in the vehicle width direction and opens at an upper end portion of the nozzle upper portion at an instrument panel.

When viewed in a cross-section along a vehicle front-rear direction, a blow-out angle formed between the nozzle upper portion and the front windshield is set such that the blow-out angle at both end portions in the vehicle width direction of the front defroster nozzle is larger than the blow-out angle at a central portion in the vehicle width direction.

According to the front defroster nozzle of the first aspect, the blow-out angle at both end portions in the vehicle width direction is larger than the blow-out angle at the central portion in the vehicle width direction. Because of this, it is easy for the air blown from the blower aperture portion to strike the windshield at both end portions in the vehicle width direction. As a result, the air spreads out in the vehicle width direction over the windshield at both end portions in the vehicle width direction. In contrast, the blow-out angle at the central portion in the vehicle width direction is smaller than the blow-out angle at both end portions in the vehicle width direction. Because of this, it is easy for the air to flow along the windshield in the central portion in the vehicle width direction, and to be supplied efficiently to upper portions of the windshield. Accordingly, air can be blown efficiently onto a wide area of the windshield. Note that the "blow-out angle" is defined as an angle that is formed at an intersection between an imaginary line, which is extended from vector direction of a central part in the vehicle front-rear direction of the nozzle upper portion, and the front windshield.

In a front defroster nozzle of a second aspect of the present disclosure, in the first aspect, the nozzle upper portion is formed so as to be rectilinear when viewed in a cross-section along a vehicle front-rear direction, and an elevation angle of the nozzle upper portion relative to a vehicle front-rear direction is set such that the elevation angle in both of the end portions in the vehicle width direction is larger than the elevation angle in the central portion in the vehicle width direction.

According to the front defroster nozzle of the second aspect, the nozzle upper portion is formed so as to be rectilinear when viewed in a cross-section along a vehicle front-rear direction. In the cross-sectional view, the direction of the air blown out from the blower aperture portion is substantially equivalent to the direction in which the nozzle upper portion is facing. In other words, the elevation angle relative to the vehicle front-rear direction of the air being blown out is approximated by the elevation angle of the nozzle upper portion. As a result of the nozzle upper portion being formed rectilinearly in this way, the airflow from the air conditioner is not obstructed, and air can be blown smoothly onto the windshield. Note that, here, 'rectilinear' is a concept that includes slightly curved shapes.

In a front defroster nozzle of a third aspect of the present disclosure, in the second aspect, the nozzle upper portion is provided with a pair of left and right gradual-change portions that are located between both of the end portions in the vehicle width direction and the central portion in the vehicle width direction, and the elevation angle of the gradual-change portions changes continuously between the elevation angle in both of the end portions in the vehicle width direction and the elevation angle in the central portion in the vehicle width direction.

According to the front defroster nozzle of the third aspect, in the nozzle upper portion, both of the end portions in the vehicle width direction and the central portion in the vehicle width direction are joined smoothly together. As a result, it is possible to inhibit a vortex from being generated between both of the end portions in the vehicle width direction and the central portion in the vehicle width direction, and a loss of pressure from being caused. Accordingly, there is no obstruction to the airflow blown from the air-conditioner and the nozzle upper portion is able to supply air even more smoothly.

In a front defroster nozzle of a fourth aspect of the present disclosure, in any one of the first through third aspects, the nozzle lower portion slopes towards the vehicle front side, and a bend portion that protrudes towards the vehicle front side is formed at a vehicle upper side of the nozzle lower portion, and a bend angle of the bend portion is set such that the bend angle at both of the end portions in the vehicle width direction is larger than the bend angle at the central portion in the vehicle width direction.

According to the front defroster nozzle of the fourth aspect, it is easy for air to flow to both end portions in the vehicle width direction where a larger bend angle is formed.

I a front defroster nozzle of a fifth aspect of the present disclosure, in any one of the first through fourth aspects, a width of a flow path in a cross-section along the vehicle front-rear direction of the nozzle upper portion is set such that the flow path width at both of the end portions in the vehicle width direction is wider than the flow path width in the central portion in the vehicle width direction.

According to the front defroster nozzle of the fifth aspect, it is easy for air to flow to both of the end portions in the vehicle width direction where a larger width of the flow path is formed.

As has been described above, the front defroster nozzle of the first aspect has the excellent effect that, while having a small size and a simple structure, it enables mist to be removed from a wide area of a windshield.

The front defroster nozzle of the second aspect has the excellent effects that it enables excellent air flow velocity to be secured at the blower aperture portion, and enables a direction of the air blown onto the windshield to be controlled by the elevation angle of the nozzle upper portion.

The front defroster nozzle of the third aspect has the excellent effect that it enables the air flow velocity at the blower aperture portion to be secured even more reliably.

The front defroster nozzle of the fourth aspect has the excellent effect that it enables the volume of air blown out from both end portions in the vehicle width direction of the blower aperture portion to be increased.

The front defroster nozzle of the fifth aspect has the excellent effect that it enables the volume of air blown out from both of the end portions in the vehicle width direction of the blower aperture portion to be increased.

BRIEF DESCRIPTION OF THE DRAWINGS

Preferred embodiments will be described in detail based on the following figures, wherein:

FIG. 7 is a diagram showing a flow velocity distribution in the blower aperture portion in a case in which the defroster nozzle according to the exemplary embodiment has been applied;

DETAILED DESCRIPTION

Hereinafter, a front defroster nozzle according to an exemplary embodiment of the present disclosure will be described using FIG. 1 through FIG. 9. Note that an arrow FR, an arrow UP, and an arrow RH that are shown in the appropriate drawings respectively indicate a vehicle forward direction, a vehicle upward direction, and a right side in a vehicle width direction. Hereinafter, if front-rear, up-down, or left-right directions are used in the following description, then, unless specifically stated otherwise, these refer respectively to the front-rear directions of the vehicle, the up-down directions of the vehicle, and the left-right directions of the vehicle (i.e., in the vehicle width direction).

Figure 1:
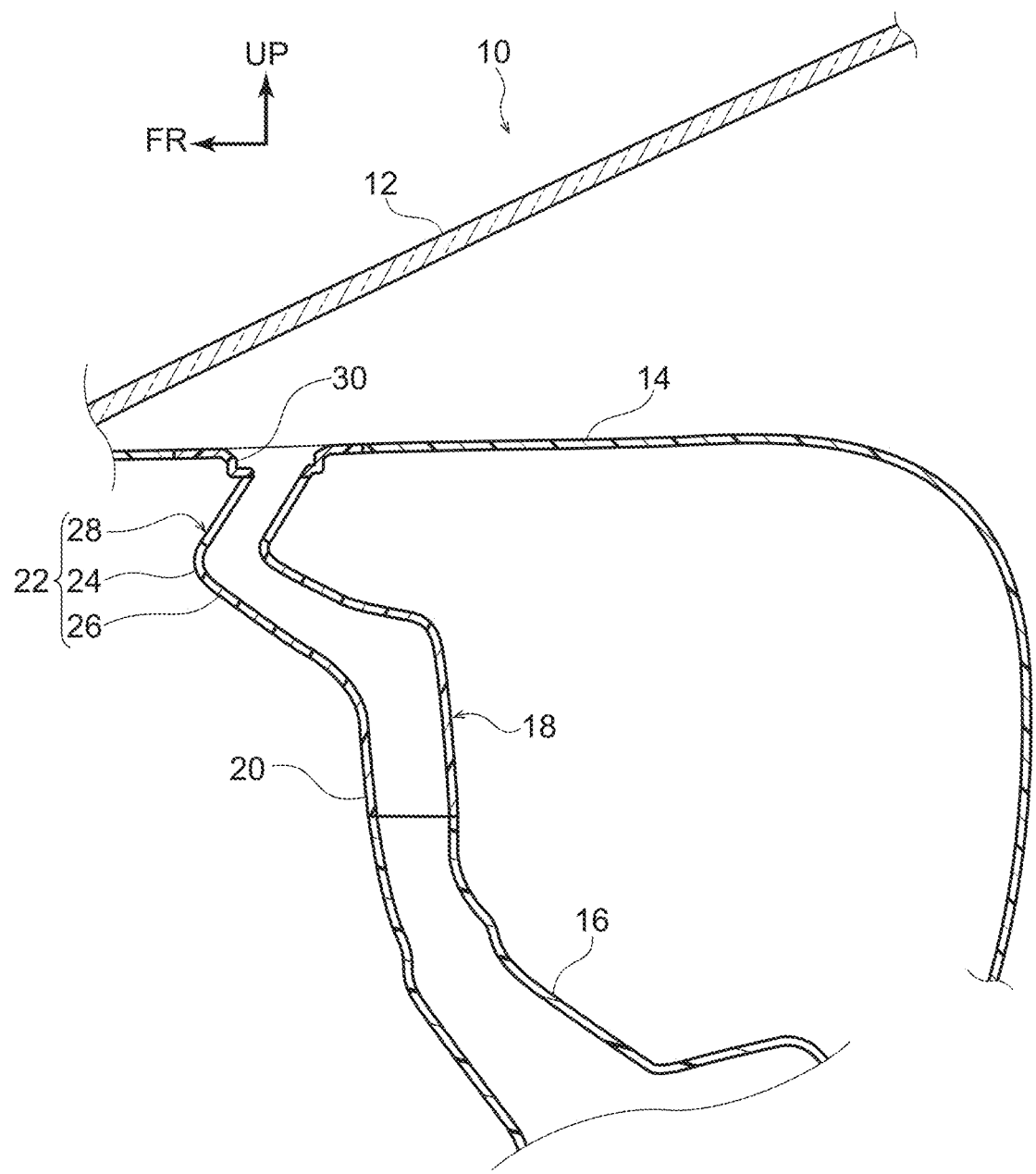
FIG. 1 is a side cross-sectional view showing an enlargement of principal portions of a vehicle in which a defroster nozzle according to an exemplary embodiment is applied.

As is shown in FIG. 1, in a front portion of a vehicle 10, an instrument panel 14 is provided underneath a front windshield 12 (hereinafter, referred to simply as a 'windshield 12'). Below the instrument panel 14 are provided an HVAC (Heating, Ventilating and Air-Conditioning Unit) 16 which serves as an air-conditioner, and a front defroster nozzle 18 (hereinafter, referred to simply as a 'defroster nozzle 18').

Figure 4:
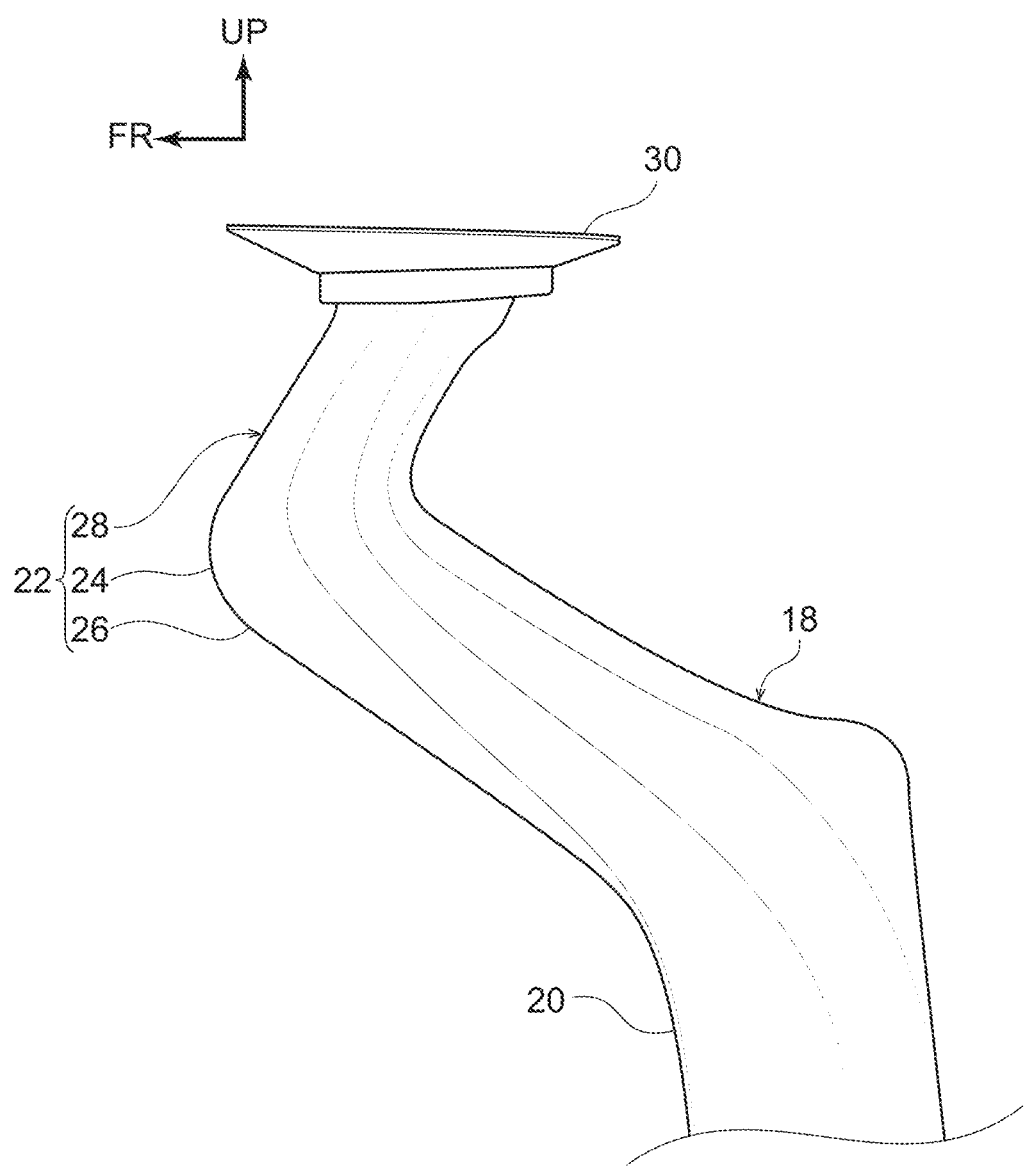
FIG. 4 is a side view as seen from a vehicle left side of the defroster nozzle shown in FIG. 2.

The defroster nozzle 18 is provided at a central portion in the vehicle width direction and is connected to the HVAC 16, and includes a connecting portion 20 that extends upwards, and an air direction adjustment portion 22 that is provided above the connecting portion 20, and is formed substantially in an L shape in a side view. As is shown in FIG. 1 and FIG. 4, the air direction adjustment portion 22 is provided with a bend portion 24 that is bent so as to protrude towards the vehicle front side. A nozzle lower portion 26 that slopes upwards towards the vehicle front side is provided on a lower side of the bend portion 24, and a nozzle upper portion 28 that slopes upwards towards the vehicle rear side is provided on an upper side of the bend portion 24. As is shown in FIG. 1, the nozzle upper portion 28 opens at an upper portion of the instrument panel 14 via a blower aperture portion 30 that is formed at an upper end portion of the nozzle upper portion 28.

Figure 2:
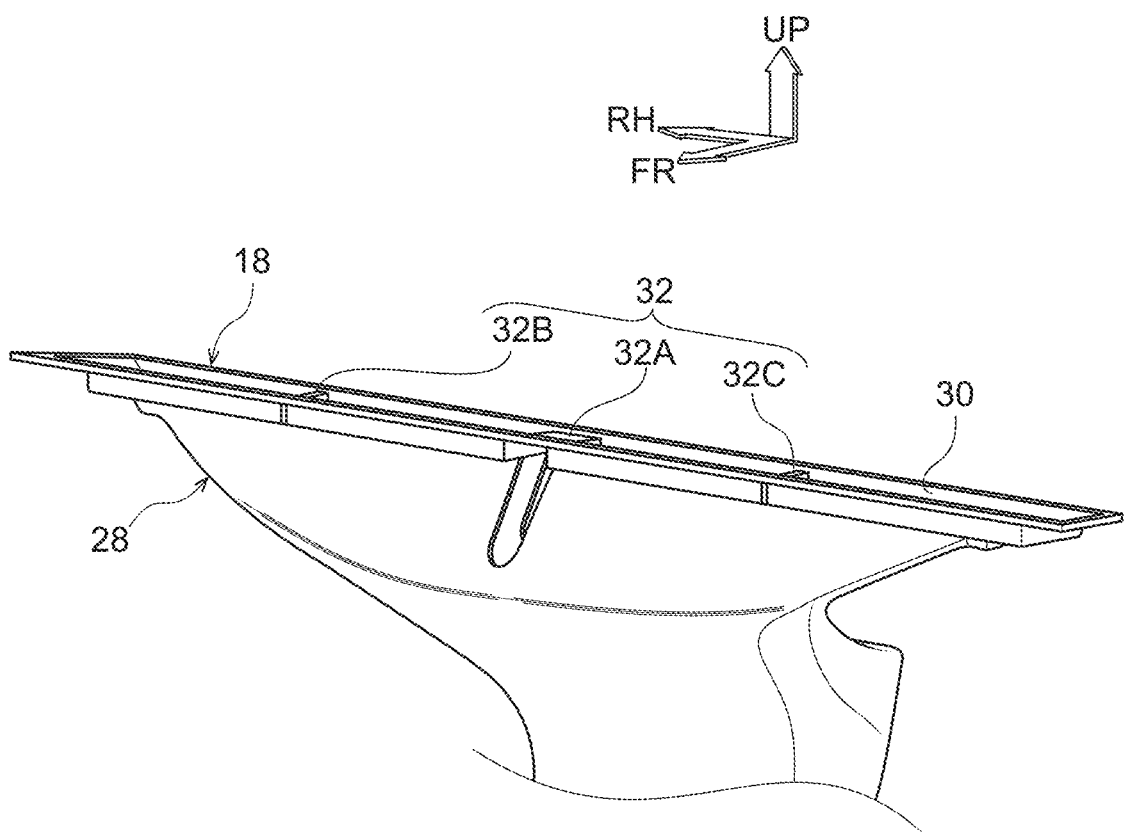
FIG. 2 is a perspective view of the defroster nozzle according to the exemplary embodiment.
Figure 3:
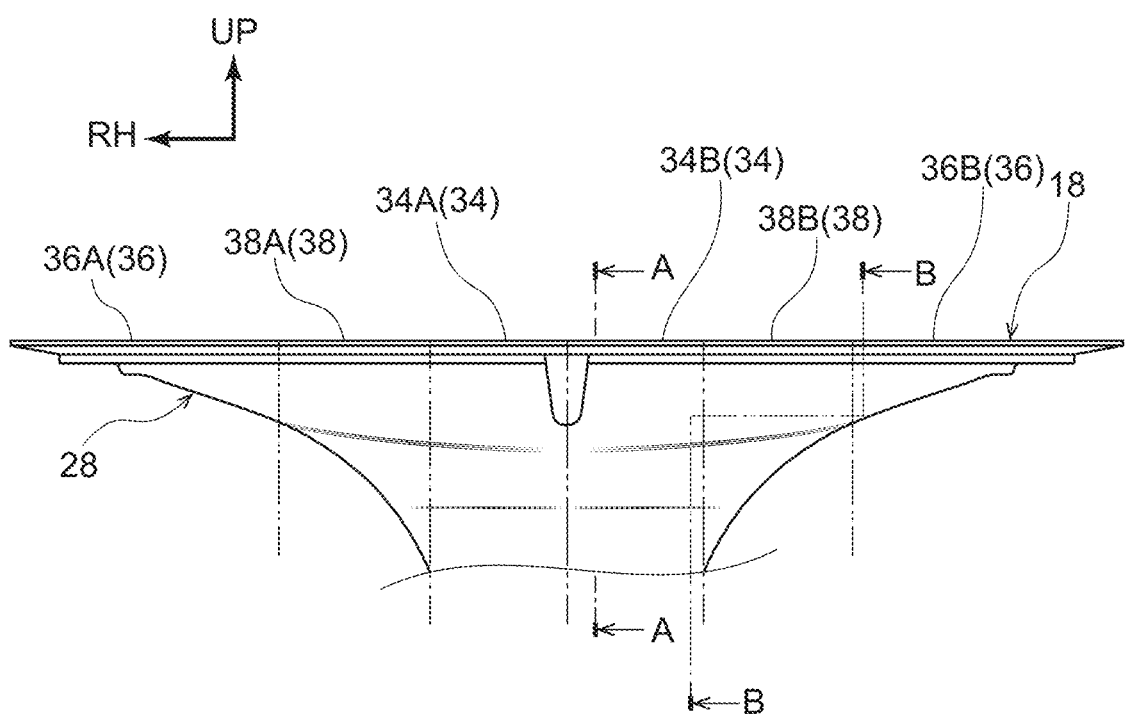
FIG. 3 is a front view as seen from a vehicle front side of the defroster nozzle shown in FIG. 2.

As is shown in FIG. 2 and FIG. 3, when viewed from a front, the defroster nozzle 18 is formed in a spreading-out fan shape as a result of the length in the vehicle width direction thereof becoming longer the closer it approaches to the upper side. As is shown in FIG. 2, the blower aperture portion 30 extends in the vehicle width direction and, in a plan view, is formed substantially in a rectangular shape. The length in the vehicle width direction of the blower aperture portion 30 is formed so as to be approximately one-third of the length in the vehicle width direction of the instrument panel 14 (see FIG. 1). In the present exemplary embodiment, as an example, the length in the vehicle width direction of the blower aperture portion 30 is set to 450 mm.

As is shown in FIG. 2, three ribs 32 are formed at the nozzle upper portion 28. A central rib 32A that is provided centrally in the vehicle width direction is formed larger than a right rib 32 that is provided on the right side and a left rib 32C that is provided on the left side. The blower aperture portion 30 is divided into four substantially equal segments in the vehicle with direction by the central rib 32A, the right rib 32B, and the left rib 32C. In addition, the right rib 32B and the left rib 32C extend towards the nozzle lower portion 26 side, and function as guide fins.

As is shown in FIG. 3, in a front view, the defroster nozzle 18 is provided with central portions 34 that are provided in a central portion in the left-right direction, a pair of side portions 36 that are provided at both end portions in the left-right direction, and a pair of left and right gradual-change portions 38 that join the central portions 34 to the side portions 36. A right side portion 36A that is provided on the right side, a right gradual-change portion 38A, and a right central portion 34A divide the right side of the defroster nozzle 18 into three substantially equal segments in the vehicle with direction. In the same way, a left side portion 36B that is provided on the left side, a left gradual-change portion 38B, and a left central portion 34B divide the left side of the defroster nozzle 18 into three substantially equal segments in the vehicle with direction.

A left side view of the defroster nozzle 18 is shown in FIG. 4. As is shown in FIG. 4, the blower aperture portion 30 is provided further to the vehicle front side from the connecting portion 20. In addition, the bend portion 24 of the air direction adjustment portion 22 is provided further to the vehicle front side from the blower aperture portion 30.

Hereinafter, a detailed description will be given of the variations in shape between the central portions 34, the side portions 36, and the gradual-change portions 38 of the defroster nozzle 18. Note that because the defroster nozzle 18 of the present exemplary embodiment is formed having left-right symmetry, only the left side is described here, and a description of the right side is omitted.

Figure 5A:
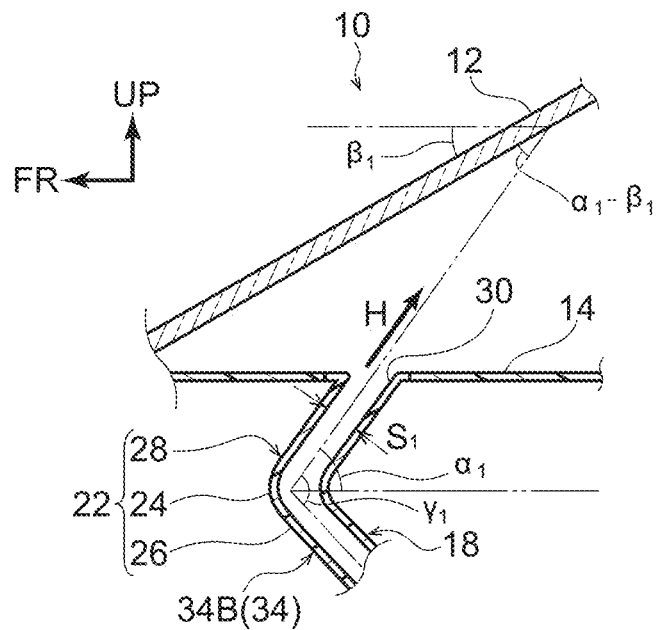
FIG. 5A is a side cross-sectional view showing principal portions of a left-central portion in the vehicle width direction of a vehicle including a cross-section taken across a line A-A in FIG. 3.
Figure 5B:
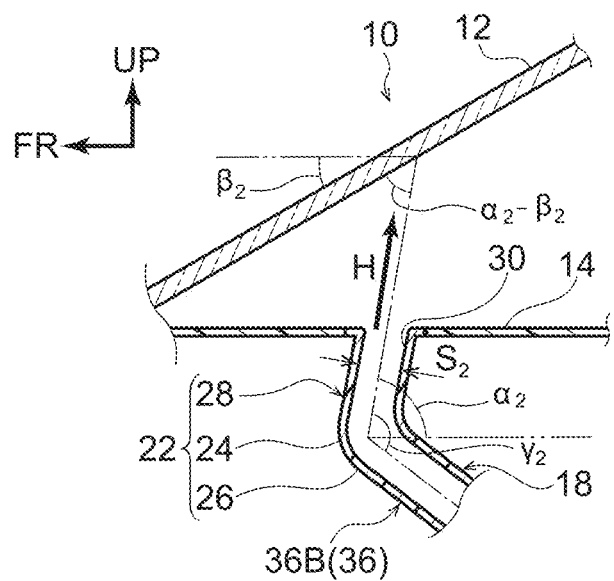
FIG. 5B is a side cross-sectional view showing principal portions of a left side portion in the vehicle width direction of a vehicle including a cross-section taken across a line B-B in FIG. 3.

A side cross-section of principal portions of the vehicle 10 including a cross-section taken across a line A-A of the left central portion 34B shown in FIG. 3 is shown in FIG. 5A, while a side cross-section of principal portions of the vehicle 10 including a cross-section taken across a line B-B of the left side portion 36B shown in FIG. 3 is shown in FIG. 5B. As is shown in these drawings, the nozzle upper portion 28 and the nozzle lower portion 26 are each formed so as to be substantially rectilinear when viewed in a cross-section taken along the vehicle front-rear direction. In FIG. 5A and FIG. 5B, a flow path center line as seen in a side cross-sectional view in the air direction adjustment portion 22 is shown by a single-dot chain line, and the vehicle front-rear direction is shown by a double-dot chain line.

If an elevation angle of the nozzle upper portion 28 relative to the vehicle front-rear direction is taken as $\alpha$, then an elevation angle $\alpha_2$ of the left side portion 36B shown in FIG. 5B is set so as to be larger than an elevation angle $\alpha_1$ of the left central portion 34B shown in FIG. 5A ($\alpha_2 > \alpha_1$).

Moreover, an inclination of the windshield 12 relative to the vehicle front-rear direction is taken as an angle of inclination $\beta$. Although the windshield 12 is slightly curved in the vehicle width direction, it is formed substantially in a planar shape. Because of this, an angle of inclination $\beta_1$ of the central portion in the vehicle width direction shown in FIG. 5A is formed as substantially the same angle as an angle of inclination $\beta_2$ of both end portions in the vehicle width direction shown in FIG. 5B ($\beta_1 \approx \beta_2$).

Accordingly, an angle formed between the direction of the air blown out from the blower aperture portion 30 and the windshield 12, in other words, an angle $\alpha$-$\beta$ between the nozzle upper portion 28 and the windshield 12 is set such that an angle $\alpha_2$-$\beta_2$ in the left side portion 36B shown in FIG. 5B is larger than an angle $\beta_1$-$\beta_1$ in the left central portion 34B shown in FIG. 5A ($\alpha_2$-$\beta_2 > \alpha_1$-$\beta_1$). More specifically, as is shown in FIG. 5A, an angle $\alpha_1$-$\beta_1$ between the nozzle upper portion 28 and the windshield 12 in the left central portion 34B is formed smaller than 30° ($\alpha_1$-$\beta_1 < 30°$). In contrast, as is shown in FIG. 5B, an angle $\alpha_2$-$\beta_2$ between the nozzle upper portion 28 and the windshield 12 in the left side portion 36B is set so as to be larger than 45° ($\alpha_2$-$\beta_2 > 45°$).

Because the nozzle upper portion 28 is formed so as to be substantially rectilinear when viewed in the side cross-section taken along the vehicle front-rear direction, a direction of conditioned air H that is blown out from the blower aperture portion 30 is substantially equivalent to the direction in which the nozzle upper portion 28 is facing when viewed in the side cross-section taken along the vehicle front-rear direction. In other words, an elevation angle $\alpha'$ (not shown in the drawings) of the conditioned air H that is blown out from the blower aperture portion 30 relative to the vehicle front-rear direction is approximated by the elevation angle $\alpha$ of the nozzle upper portion 28 ($\alpha' \approx \alpha$). Accordingly, an angle $\alpha'$-$\beta$ between the direction of the conditioned air H blown out from the blower aperture portion 30 and the windshield 12 (hereinafter, referred to as a 'blow-out angle') is approximated by the angle $\alpha$-$\beta$ between the flow path center line of the nozzle upper portion 28 and the windshield 12 (a'-$\beta \approx \alpha$-$\beta$).

Figure 6:
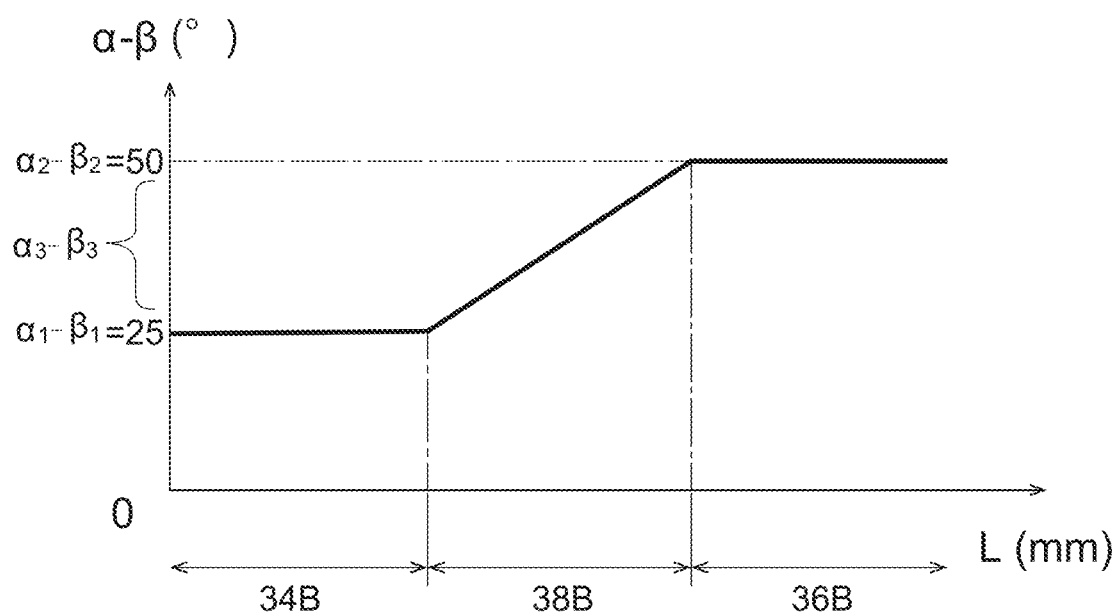
FIG. 6 is a graph showing a relationship between a blow-out angle and a distance from a center in the vehicle width direction of the defroster nozzle according to the exemplary embodiment.

Hereinafter, taking $\alpha$-$\beta$ as the blow-out angle, changes in the blow-out angle will be described in detail using FIG. 6. A relationship between a distance L from a left-right center of the defroster nozzle 18 and the blow-out angle $\alpha$-$\beta$ is shown in a graph in FIG. 6. In the present exemplary embodiment, as an example, a center blow-out angle $\alpha_1$-$\beta_1$ in the left central portion 34B is formed as $\alpha_1$-$\beta_1 = 25°$, while a side blow-out angle $\alpha_2$-$\beta_2$ in the left side portion 36B is formed as $\alpha_2$-$\beta_2$=50°. As is shown in FIG. 6, a blow-out angle $\alpha_3$-$\beta_3$ of the left gradual-change portion 38B that is provided between the left central portion 34B and the left side portion 36B is formed so as to change continuously between the center blow-out angle $\alpha_1$-$\beta_1$ and the side blow-out angle $\alpha_2$-$\beta_2$. As is described above, because the angle of inclination $\beta$ of the windshield 12 is substantially constant, an elevation angle $\alpha$3 of the left gradual-change portion 38B is formed such that $\alpha_1$<$\alpha_3$<$\alpha_2$.

As is shown in FIG. 5A and FIG. 5B, a bend angle of the bend portion 24 (i.e., an angle formed between the nozzle upper portion 28 and the nozzle lower portion 26 when viewed in the side cross-section taken along the vehicle front-rear direction) is taken as $\gamma$. At this time, a bend angle $\gamma_2$ in the left side portion 36B shown in FIG. 5B is set so as to be larger than a bend angle $\gamma_1$ in the left center portion 34B shown in FIG. 5A.

In addition, if a cross-sectional width of a flow path taken orthogonally across the flow of the conditioned air H in the nozzle upper portion 28 is taken as a flow path width S, then a flow path width $S_2$ in the left side portion 36B shown in FIG. 5B is set so as to be wider than a flow path width $S_1$ in the left central portion 34B shown in FIG. 5A.

Actions and Effects of the Present Exemplary Embodiment

Next, actions and effects of the present exemplary embodiment will be described.

According to the defroster nozzle 18 according to the present exemplary embodiment, the side blow-out angle $\alpha_2$-$\beta_2$ in the left side portion 36B is set so as to be larger than 45° ($\alpha_2$-$\beta_2$>45°). In addition, the right side of the defroster nozzle 18 has the same type of structure. As a consequence, it is easy for the conditioned air H blown out from the right side portion 36A and the left side portion 36B to strike the windshield 12. Accordingly, at both end portions 12B (see FIG. 9B) in the vehicle width direction of the windshield 12, it is easy for the conditioned air H to spread out in the vehicle width direction.

In contrast, the center blow-out angle $\alpha_1$-$\beta_1$ in the left central portion 34B is formed smaller than 30° ($\alpha_1$-$\beta_1$<30°). In other words, the elevation angle $\alpha_1$ of the nozzle upper portion 28 of the left central portion 34B is set so as to be even closer to the angle of inclination $\beta_1$ of the windshield 12. In addition, the right side of the defroster nozzle 18 has the same type of structure. As a consequence, it is easy for the conditioned air H blown out from the central portions 34 to flow along the windshield 12. Accordingly, in the central portion 12A (see FIG. 9B) in the vehicle width direction of the windshield 12, the conditioned air H is efficiently blown to the upper portion of the windshield 12.

Figure 8A:
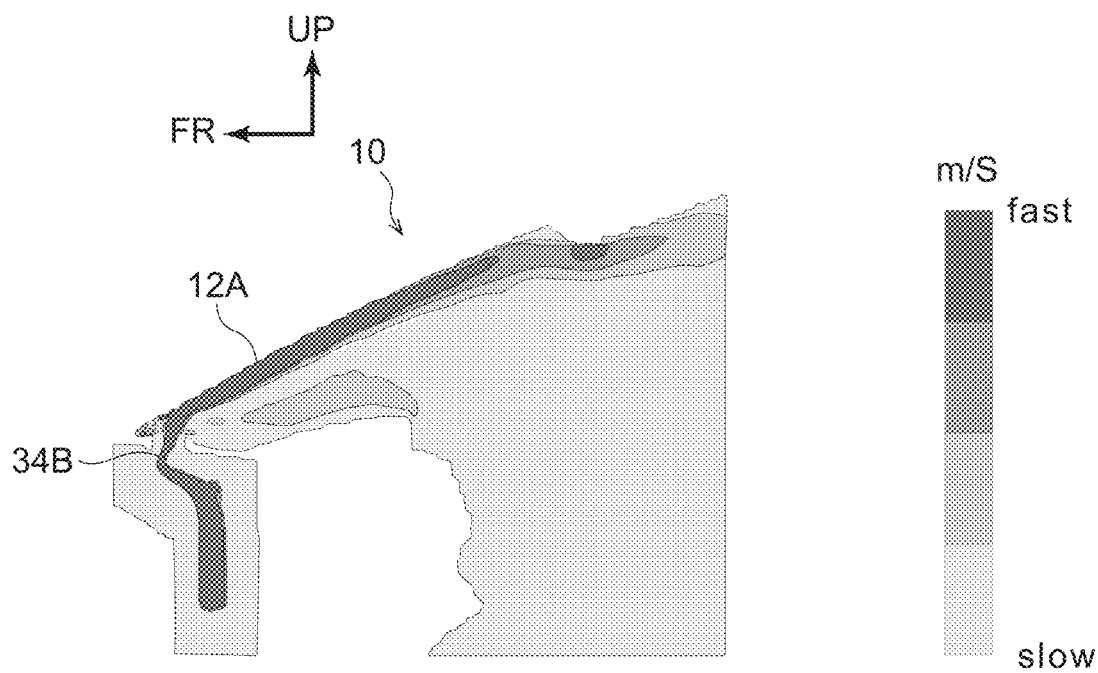
FIG. 8A is a diagram showing a flow velocity distribution at the cross-section along the line A-A in FIG. 3.
Figure 8B:
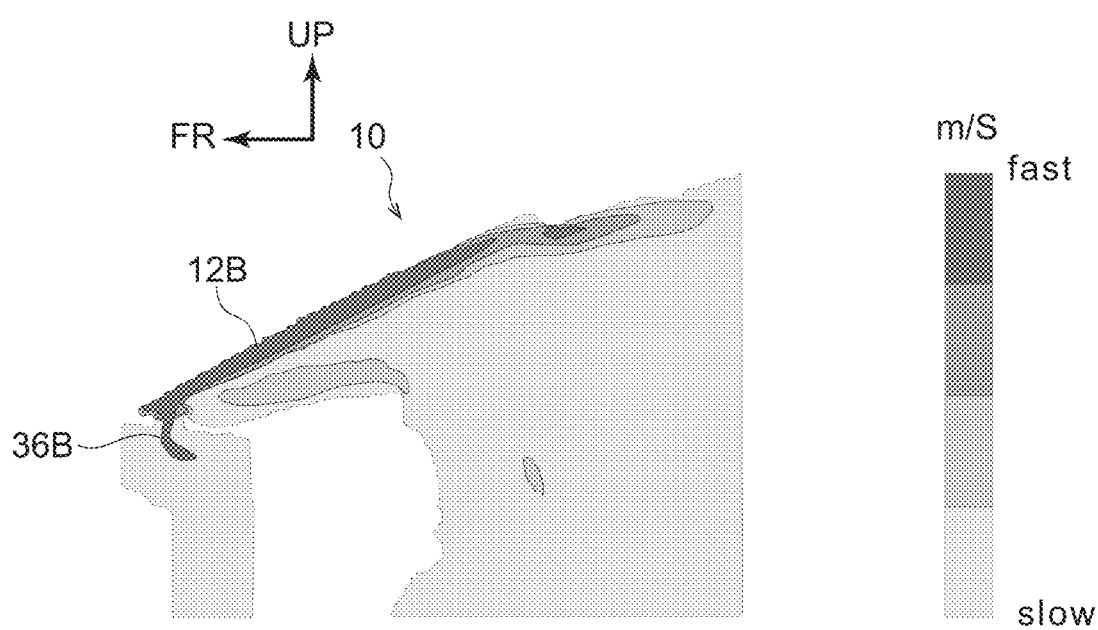
FIG. 8B is a diagram showing a flow velocity distribution at the cross-section along the line B-B in FIG. 3.

A diagram of the flow velocity distribution at a side cross-section of principal portions of the vehicle 10 including a cross-section taken along the line A-A of the left central portion 34B is shown in FIG. 8A. In contrast, a flow velocity distribution diagram at a side cross-section of principal portions of the vehicle 10 including a cross-section taken along the line B-B of the left side portion 36B is shown in FIG. 8B. Variations in the depth of shading indicate the range of the flow velocity, namely, the darker the shading, the faster the flow velocity. In the event that the flow velocity distribution in the vicinity of the windshield 12 is compared between FIG. 8A and FIG. 8B, it can be seen that at the end portions 12B in the vehicle width direction of the windshield 12, approximately the same air flow velocity can be secured as in the central portion 12A in the vehicle width direction of the windshield 12.

Figure 9A:
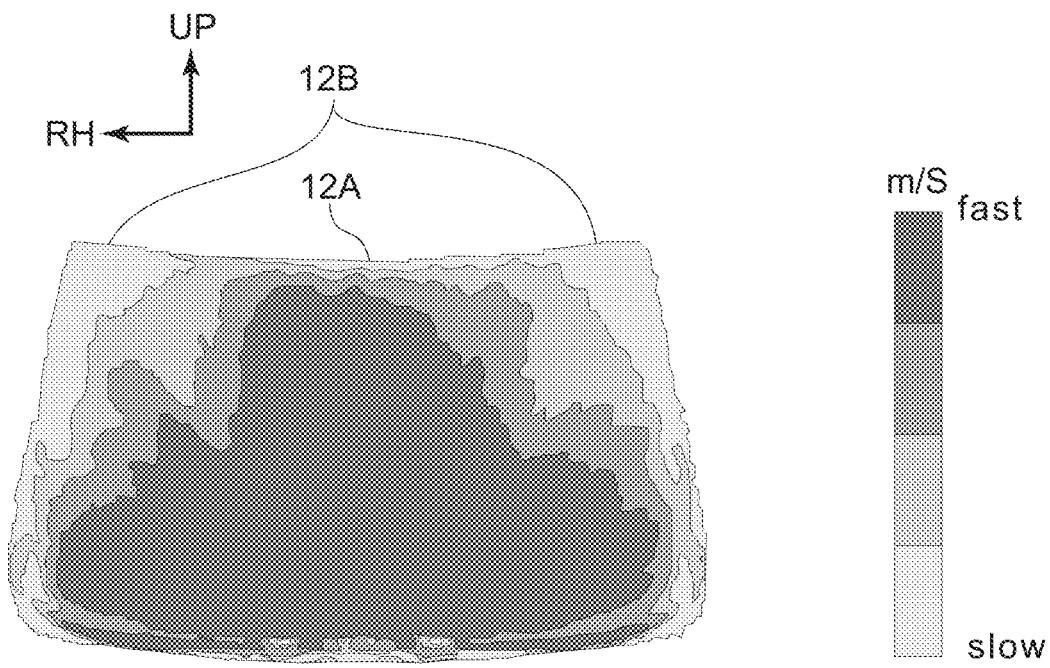
FIG. 9A is a diagram showing a flow velocity distribution on a windshield in a case in which a defroster nozzle of a comparative example has been applied.
Figure 9B:
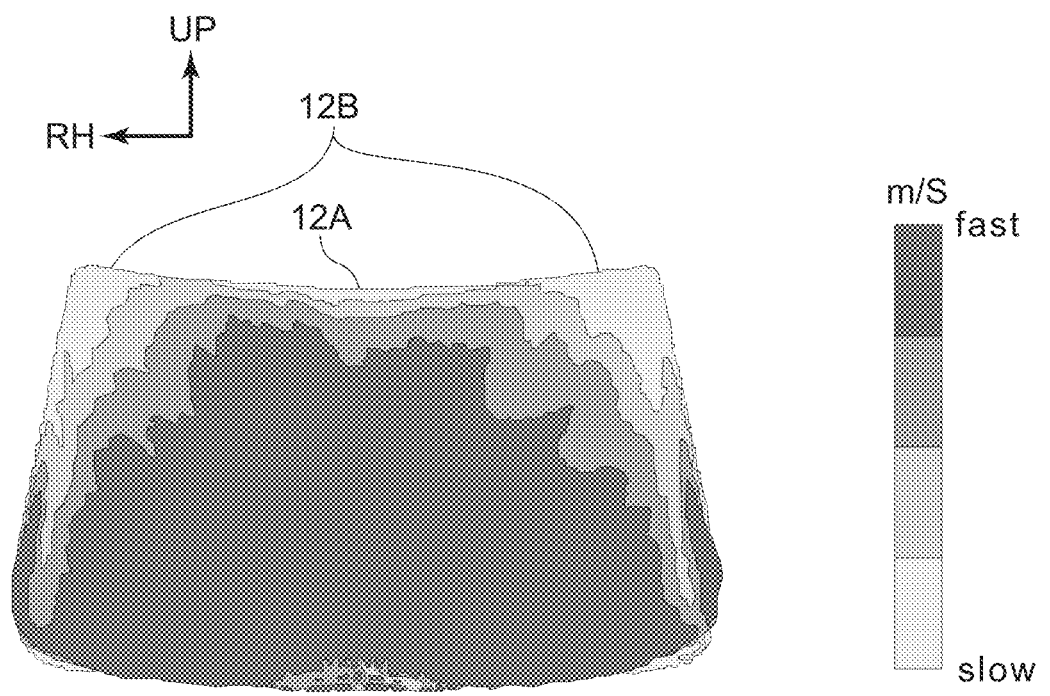
FIG. 9B is a diagram showing a flow velocity distribution on a windshield in a case in which a defroster nozzle of the exemplary embodiment has been applied.

Furthermore, as a comparative example compared to the defroster 18 according to the present exemplary embodiment, a diagram of the flow velocity distribution on the windshield 12 when a defroster nozzle (not shown in the drawings) in which the length in the vehicle width direction of the blower aperture portion was set to 600 mm was used is shown in FIG. 9A. In contrast, a diagram of the flow velocity distribution on the windshield 12 when the defroster nozzle 18 according to the present exemplary embodiment in which the length in the vehicle width direction of the blower aperture portion 30 was set to 450 mm was used is shown in FIG. 9B. In the same way as in FIG. 8, the darker the shading, the faster the flow velocity. In FIG. 9A and FIG. 9B, in the event that the left and right end portions 12B of the windshield 12 are compared, it can be seen that the smaller-sized defroster nozzle 18 according to the present exemplary embodiment enables a greater air flow velocity to be secured more widely, namely, as far as the left and right two end portions 12B of the windshield 12 compared to the larger-sized defroster nozzle of the comparative example. Accordingly, while having a small size and a simple structure, the defroster nozzle 18 enables air to be blown efficiently over a wide area of the windshield 12, and thereby enables mist to be removed from a wide area of the windshield 12.

Moreover, according to the defroster nozzle 18 of the present exemplary embodiment, the nozzle upper portion 28 is formed so as to be substantially rectilinear when viewed in the side cross-section taken along the vehicle front-rear direction. The direction of conditioned air H that is blown out from the blower aperture portion 30 is substantially equivalent to the direction in which the nozzle upper portion 28 is facing when viewed in the cross-section taken along the vehicle front-rear direction. In other words, an elevation angle $\alpha'$ of the conditioned air H that is blown out from the blower aperture portion 30 relative to the vehicle front-rear direction is approximated by the elevation angle $\alpha$ of the nozzle upper portion 28 ($\alpha'\approx\alpha$). Accordingly, an angle $\alpha'$-$\beta$ between the direction of the conditioned air H and the windshield 12 is approximated by the blow-out angle $\alpha$-$\beta$ between the nozzle upper portion 28 and the windshield 12 ($\alpha'$-$\beta\approx\alpha$-$\beta$). Accordingly, the direction of conditioned air H that is blown onto the windshield 12 can be controlled using the elevation angle $\alpha$ of the nozzle upper portion 28.

Furthermore, as a result of the nozzle upper portion 28 being formed so as to be substantially rectilinear in this way, the airflow from the HVAC 16 is unobstructed by the nozzle upper portion 28, and air can be blown smoothly onto the windshield 12. Accordingly, a superior air flow velocity can be secured at the blower aperture portion 30.

Furthermore, the nozzle upper portion 28 is provided with the pair of left and right gradual-change portions 38 between the side portions 36 and the central portion 34. In other words, in the nozzle upper portion 28, the side portions 36 and the central portions 34 are joined smoothly together. As a result, in the nozzle upper portion 28, it is possible to inhibit a vortex from being generated between the side portions 36 that have a large elevation angle $\alpha$ and the central portions 34 that have a small elevation angle $\alpha$, and a loss of pressure from being caused. Accordingly, the nozzle upper portion 28 is able to supply air even more smoothly without the airflow of the conditioned air H, which is blown from the HVAC 16, being obstructed. Accordingly, the air flow velocity at the blower aperture portion 30 can be secured even more reliably.

Moreover, a diagram of the flow velocity distribution in the blower aperture portion 30 is shown in FIG. 7. In the same way as in FIG. 8 and FIG. 9, the darker the shading, the faster the flow velocity. Generally, because a defroster nozzle is formed substantially in a fan shape in a front view, it is easier to blow air to the central portions than to the side portions so that the problem arises that the air volume is insufficient at side portions of the blower aperture portion. However, according to the defroster nozzle 18 of the present exemplary embodiment, the bend angle $\gamma_2$ in the left side portion 36B is set so as to be larger than the bend angle $\gamma_1$ in the left center portion 34B. In addition, the flow path width $S_2$ in the left side portion 36B is set so as to be wider than the flow path width $S_1$ in the left central portion 34B. As a result, as is shown in FIG. 7, it is possible to increase the velocity of the air blown out from the side portions 36 of the blower aperture portion 30. Accordingly, the volume of air blown out from the side portions 36 can be increased.

Supplementary Description to the Above-Described Exemplary Embodiment

In the above-described exemplary embodiment, a description is given of a case in which the nozzle upper portion 28 and the nozzle lower portion 26 are both formed so as to be substantially rectilinear when viewed in the cross-section taken along the vehicle front-rear direction, however, the present disclosure is not limited to this, and it is also possible, for example, for the nozzle lower portion to be formed in a curved shape.

Moreover, in the above-described exemplary embodiment, a description is given of a case in which the gradual change portions 38 are formed such that the elevation angle $\alpha_3$ thereof changes continuously between the elevation angle $\alpha_1$ in the central portions 34 and the elevation angle $\alpha_2$ in the side portions 36, however, the present disclosure is not limited to this. For example, it is also possible for no gradual-change portions to be provided in the defroster nozzle.

Furthermore, in the above-described exemplary embodiment, a description is given of a case in which the bend angle $\gamma_2$ in the left side portion 36B is set so as to be larger than the bend angle $\gamma_1$ in the left center portion 34B, however, the present disclosure is not limited to this. For example, it is also possible for the bend angle $\gamma_2$ in the left side portion 36B to be the same as the bend angle $\gamma_1$ in the left center portion 34B ($\gamma_2=\gamma_1$) in a case in which a blow-out angle size relationship in which $\alpha_2-\beta_2>\alpha_1-\beta_1$ is satisfied.

In addition, in the above-described exemplary embodiment, a description is given of a case in which the flow path width $S_2$ in the left side portion 36B is set so as to be wider than the flow path width $S_1$ in the left central portion 34B, however, the present disclosure is not limited to this. For example, it is also possible for the flow path width $S_2$ in the left side portion 36B to be the same as the flow path width $S_1$ in the left center portion 34B ($S_2=S_1$).

Moreover, in the above-described exemplary embodiment, a description is given of a case in which the blower aperture portion 30 is substantially rectangular in a plan view, and is formed so as to be approximately one-third of the length in the vehicle width direction of the instrument panel 14, however, the present disclosure is not limited to this. For example, it is also possible for the blower aperture portion to be provided such that the side portions are positioned further to the front than the central portions.

Furthermore, in the above-described exemplary embodiment, a description is given of a case in which three ribs 32 are formed in the nozzle upper portion 28, however, the present disclosure is not limited to this and it is also possible for no ribs to be provided in the nozzle upper portion.

In addition, in the above-described exemplary embodiment, a description is given of a case in which the front defroster nozzle 18 is not molded integrally with side defrosters, however, the present disclosure is not limited to this and it is also possible for the front defroster nozzle to be molded integrally with side defrosters that remove mist from side windows.

Moreover, in the above-described exemplary embodiment, a description is given of a case in which the left and right side portions 36A and 36B, the gradual-change portions 38A and 38B, and the central portions 34A and 34B are formed so as to divide the right side or the left side of the defroster nozzle 18 into three substantially equal segments in the vehicle width direction. However, the present disclosure is not limited to this and it is also possible for the sizes of the side portions, the gradual-change portions, and the central portions to be appropriately altered in accordance with the overall size and placement location of the defroster nozzle.

Furthermore, in the above-described exemplary embodiment, a description is given of a case in which the defroster nozzle 18 is formed having left-right symmetry, however, the present disclosure is not limited to this and it is also possible for the defroster nozzle to be formed having mutually asymmetrical left and right sides.

An exemplary embodiment of the present disclosure has been described above, however, the present disclosure is not limited to this. Various modifications and the like may be made to the present disclosure insofar as they do not depart from the scope of the present disclosure.

What is claimed is:

1. A front defroster nozzle comprising:
   a connecting portion that is configured to be connected to an air conditioner at a vehicle lower side of a central portion in a vehicle width direction of a front windshield of an automobile;
   a nozzle lower portion provided at a vehicle upper side of the connecting portion; and
   a nozzle upper portion provided at a vehicle upper side of the nozzle lower portion, so as to slope towards a vehicle rear side, the nozzle upper portion having a blower aperture portion that extends in the vehicle width direction and opens at an upper end portion of the nozzle upper portion and at an instrument panel,
   wherein
   the nozzle upper portion includes end portions and a central portion between the end portions in the vehicle width direction,
   while the nozzle upper portion extends upwardly, the central portion of the nozzle upper portion slopes more towards the vehicle rear side than the end portions such that when viewed in a cross-section taken along a vehicle front-rear direction, a first blow-out angle formed between each of the end portions of the nozzle upper portion and the front windshield is larger than a second blow-out angle formed between the central portion of the nozzle upper portion and the front windshield, and
   the first blow-out angle is larger than a first predetermined angle.

2. The front defroster nozzle according to claim 1, wherein
when viewed in the cross-section taken along the vehicle front-rear direction,
the nozzle upper portion is rectilinear, and
a first elevation angle of each of the end portions of the nozzle upper portion relative to the vehicle front-rear direction is larger than a second elevation angle of the central portion of the nozzle upper portion relative to the vehicle front-rear direction.

3. The front defroster nozzle according to claim 2, wherein
the nozzle upper portion further includes a pair of left and right gradual-change portions,
each of the pair of left and right gradual-change portions is that are located between one of the end portions of the nozzle upper portion and the central portion of the nozzle upper portion in the vehicle width direction, and
an elevation angle of one of the left and right gradual-change portions changes continuously between the first elevation angle of the end portion adjacent to said one of the left and right gradual-change portions and the second elevation angle.

4. The front defroster nozzle according to claim 1, wherein
the nozzle lower portion slopes towards a vehicle front side while extending upwardly,
the front defroster nozzle further comprises a bend portion that protrudes towards the vehicle front side and is formed at the vehicle upper side of the nozzle lower portion,
when viewed in the cross-section taken along the vehicle front-rear direction,
a first bend angle of the bend portion is formed between each of the end portions of the nozzle upper portion and the nozzle lower portion, and
a second bend angle of the bend portion is formed between the central portion of the nozzle upper portion and the nozzle lower portion, and
the first bend angle is larger than the second bend angle.

5. The front defroster nozzle according to claim 1, wherein
when viewed in the cross-section taken along the vehicle front-rear direction,
a first flow path of each of the end portions of the nozzle upper portion has a first flow path width orthogonal to the first flow path,
a second flow path of the central portion of the nozzle upper portion has a second flow path width orthogonal to the second flow path,
the first flow path width is greater than the second flow path width.

6. The front defroster nozzle according to claim 1, wherein
the first predetermined angle is 45°.

7. The front defroster nozzle according to claim 1, wherein
the second blow-out angle is smaller than 30°.

8. The front defroster nozzle according to claim 7, wherein
the first predetermined angle is 45°.

* * * * *